Nov. 14, 1933. D. H. REEVES 1,934,884
REFRIGERATING APPARATUS
Original Filed May 30, 1929  2 Sheets-Sheet 1

Inventor
Donald H. Reeves
By Spencer, Hardman & Fehr
Attorneys

Nov. 14, 1933.  D. H. REEVES  1,934,884
REFRIGERATING APPARATUS
Original Filed May 30, 1929    2 Sheets-Sheet 2
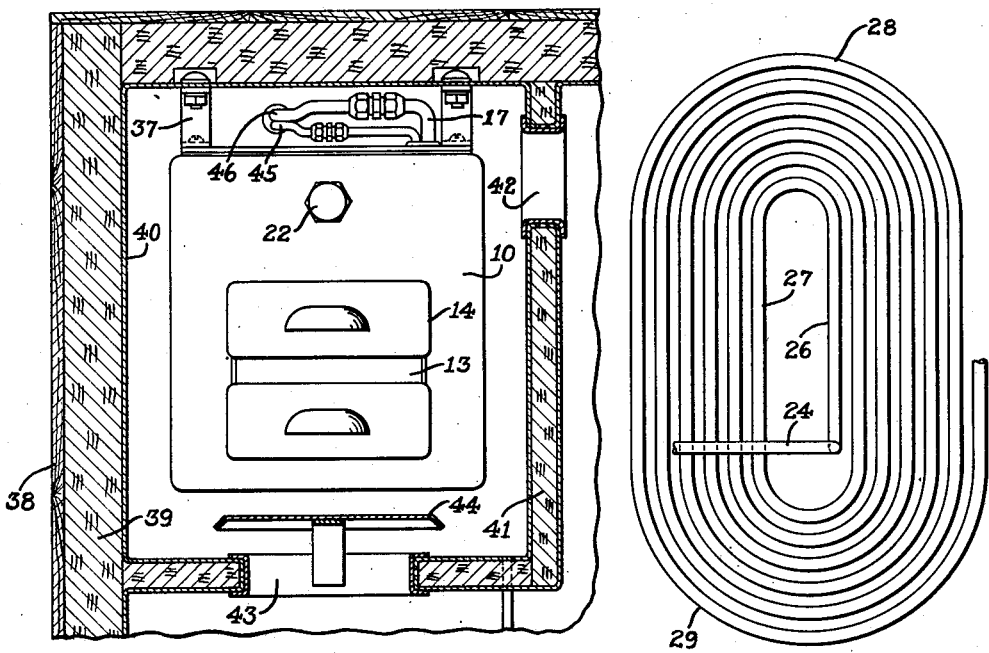
Fig. 7
Fig. 3
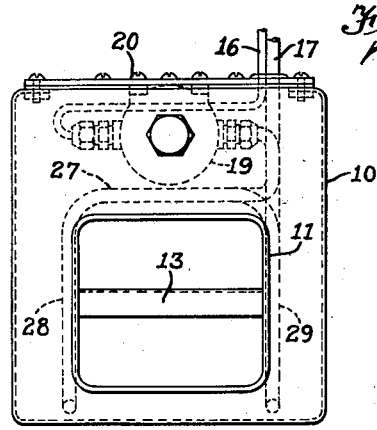
Fig. 6
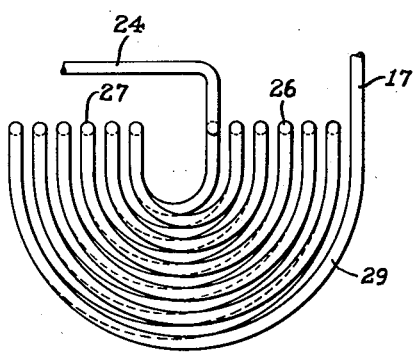
Fig. 4
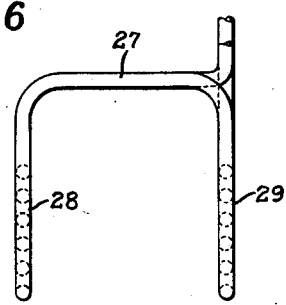
Fig. 5
Inventor
Donald H. Reeves
By Spencer Hardman & Fehr
Attorneys Patented Nov. 14, 1933

1,934,884

UNITED STATES PATENT OFFICE 1,934,884

REFRIGERATING APPARATUS

Donald H. Reeves, Dayton, Ohio, assignor to Frigidaire Corporation, Dayton, Ohio, a corporation of Delaware Application May 30, 1929, Serial No. 367,159
Renewed March 22, 1933

11 Claims. (Cl. 62—95)

This invention relates to refrigerating apparatus and especially to a cooling unit comprised of a brine tank and an expansion coil.

An object of the invention is to provide a brine tank that is of pleasing appearance and very easily cleaned.

Another object of the invention is to provide an expansion coil and brine tank that are very easily assembled and which are efficient in operation.

Another object of the invention is to provide a porcelain covered brine tank having a substantially horse shoe shaped expansion coil and an expansion valve supported from the under side of a removable cover for the brine tank.

Further objects and advantages of the present invention will be apparent from the following description, reference being had to the accompanying drawings, wherein a preferred form of the invention is clearly shown.

In the drawings:

Fig. 3 is a top view of the expansion coil before being bent into its horse shoe shape.

Fig. 4 is an end view of the expansion coil after it has been bent into a horse shoe shape.

Fig. 5 is a front view of Fig. 4.

Fig. 6 is a front view of a brine tank with the position of the expansion system indicated in dotted lines.

Fig. 7 is a partial cross section of a refrigerator cabinet disclosing a cooling unit installed therein.

It has hitherto been the general custom to have the expansion valve of an expansion system located on the outside of the brine tank. Presence of this exterior expansion valve has detracted from the appearance of the cooling unit. In certain cases where the expansion valve is placed on the interior of the brine tank the expansion valve was not readily accessible for adjustment nor was the expansion system readily removable from the brine tank. Accordingly it is one of the objects of the invention to conceal the expansion valve in the brine tank and yet have the valve easily accessible for adjustment and also have the whole expansion system very easily removable from the brine tank.

Figure 1:
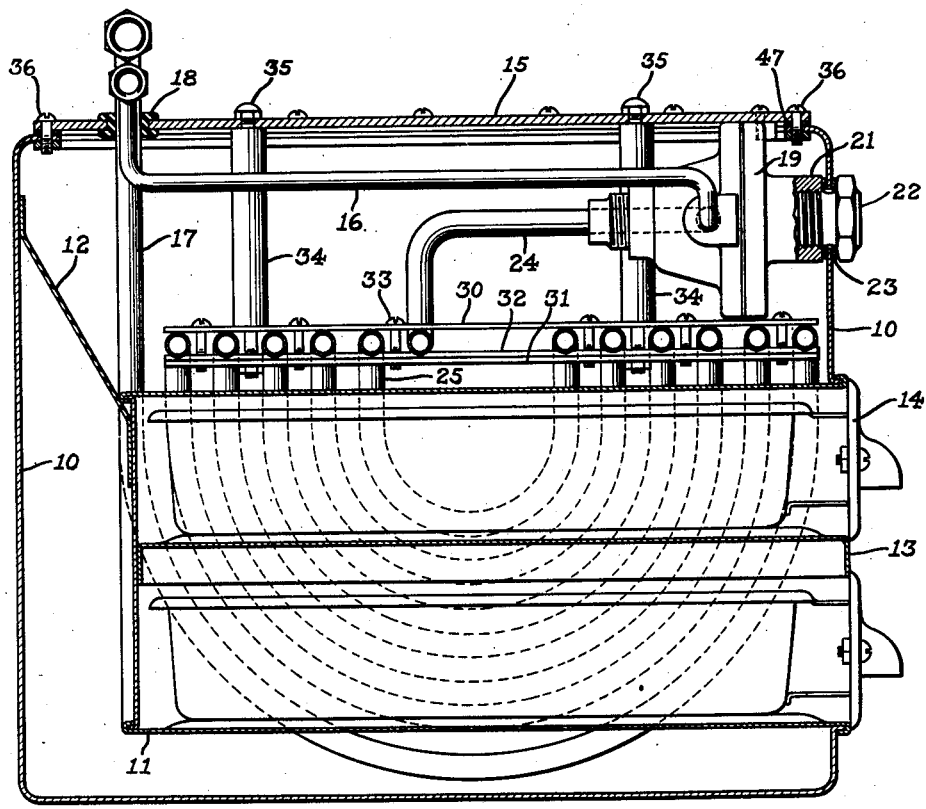
Fig. 1 is a longitudinal cross section thru a cooling unit constructed according to the invention.
Figure 2:
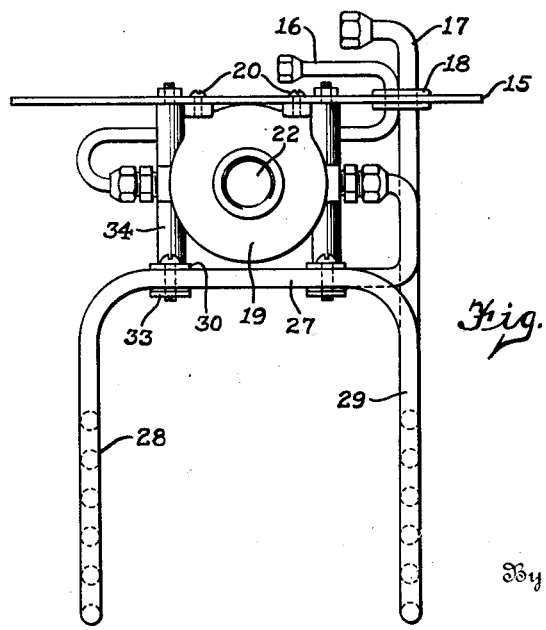
Fig. 2 is a front view of the cover expansion valve and expansion coil removed from the brine tank.

In Figs. 1, 6 and 7 is disclosed the brine tank 10 suitable for containing the usual brine such as solutions of alcohol and calcium chloride. The exterior of the tank is preferably coated with vitreous enamel such as porcelain in order that it may be very easily cleaned and be of pleasing appearance. A freezing compartment having the walls 10 occupies a portion of the space of the brine tank. This freezing compartment has preferably a support 12 for its rear wall attached to the rear wall of the brine tank. The front of the freezing compartment opens at the front of the brine tank and has one or more shelves 13 for receptacles 14 commonly referred to as ice trays. The brine tank has an easily removed cover 15 thru which a refrigerant supply conduit 16 and a refrigerant return conduit 17 extend into the interior of the brine tank surrounded by a grommet 18. A supply conduit 16 is connected to an expansion valve 19 of any type altho a structure similar to that disclosed in Fig. 3 of the patent to G. M. Troup 1,704,522 issued March 5, 1929 is preferred. The expansion valve 19 is preferably fastened to the top of the cover by the fastening means 20 as disclosed in Figs. 2 and 6. A projection 21 on the valve abuts the front wall of the brine tank 10 and a nut 22 is screwed into this projection 21 from the exterior of the brine tank. Suitable washers 23 protect the coating on the brine tank at this point. The nut 22 is suitably coated to agree in appearance with the exterior of the brine tank or may be plated with a material of high polishability such as chromium. This nut is easily unscrewed to permit adjustment of the valve from the exterior of the casing by a suitable tool reaching into the projection 21. A conduit 24 leads from the expansion valve 19 to the expansion coil generally referred to as 25. This expansion coil is preferably first formed into a flat spiral of substantially elliptical shape having the straight parts or conduits 26 and 27 and the curved ends 28 and 29 as disclosed in Fig. 3. The curved ends 28 and 29 are then preferably bent at right angles to the straight portions 26 and 27 to form a horse shoe shaped or inverted U-shaped coil such as is disclosed in Figs. 4 and 5. The space between the bent down curved portions 28 and 29 as disclosed in Fig. 5 is preferably such that when the coil is inserted into the brine tank these curved ends will fit snugly around the opposite side walls of the walls or sleeve 11 of the freezing compartment and make direct contact therewith as disclosed in Fig. 6. A plurality of metal spacers 31 maintain the straight portions 26 and 27 in a plane by means of the fastening means 33. A resilient material 32 may be placed between one of these metal spacers and the coil before the fastening means 33 is secured thereto so that the coils will be maintained in their proper horizontal position. If desired one or more of the parts 30 or 31 may be corrugated to position the tube in place of using the resilient material 32. Spacing members 34 are secured to the spacing members 30 and 31 and are attached at their other end to the removable cover 15 by means of a fastening means 35. These members 34 maintain the coil at its proper position below the cover so that it may effectively cover opposite sides of the freezing compartment. The cover is fastened on by the easily removed screws 36. As disclosed in Fig. 7 the brine tank is attached to the cabinet by the strips 37. The cabinet of course may be of any preferred construction and have the outer covering 38, insulation 39 and inner coating 40 as disclosed in the drawings. The cooling unit is preferably installed in a partition 41 of such a cabinet which has the openings 42 and 43 for directing the current of air around the brine tank. A bonnet 44 prevents dripping of condensation upon the food below the opening 43. Conduits 45 and 46 connect the conduit 16 and 17 to any type of compressor condenser unit such as disclosed in Fig. 1 of Troup Patent 1,704,522 referred to above.

It will be noted from Fig. 7 that while the expansion coil is concealed within the brine tank that an adjustment of the valve may be easily made by unscrewing the nut 22. Furthermore if it is necessary to disassemble the structure as disclosed in Fig. 1 the nut 22 and screws 36 may be very easily removed from the brine tank and then the cover, expansion valve and expansion coil moved as a unit to the rear until the projection 21 of the expansion valve clears the front upper flange 47 of the brine tank. The cover with the expansion system attached therto may then be lifted up out of the brine tank. In this manner the mechanism may be easily taken apart for servicing and easily replaced if such a need should arise. It is to be further noted in Fig. 6 that the coil parts 28 and 29 are in direct contact with the wall or sleeve of the freezing compartment and hence there is a good thermal contact from the refrigerant in the coil to the freezing chamber.

While the form of embodiment of the invention as herein disclosed constitues a preferred form, it is to be understood that other forms might be adopted, all coming within the scope of the claims which follows.

What is claimed is as follows:

1. In combination a brine tank, a freezing compartment in said brine tank and a substantially flat inverted U shaped expansion coil adapted to be vertically inserted in said brine tank with the coil portions of at least one leg of the U extending substantially vertically along and in direct contact with a wall of said freezing compartment.

2. In combination a brine tank, a freezing compartment in said brine tank and a substantially flat inverted U shaped expansion coil adapted to be vertically inserted in said brine tank with the coil portions of the legs of the U extending substantially vertically along and in direct contact with two opposite walls of said freezing compartment.

3. A cooling unit for refrigerating apparatus including a brine tank having a removable top cover, an expansion valve and an expansion coil connected to the top cover on its under side and removable therewith, detachable means secured to said expansion valve and having a portion thereof projecting through the front wall of the brine tank, said detachable means providing access to the valve from the exterior of said tank.

4. A cooling unit for refrigerating apparatus including a brine tank having a removable cover, and a flat spiral coil having at least one of its edges bent down, the coil being connected to the cover on its under side.

5. A cooling unit for refrigerating apparatus including a brine tank having a removable cover, an expansion valve connected to the cover on its under side, means to provide an external adjustment for the expansion valve including a cap member projecting through the wall of the brine tank and screwed into the expansion valve, and an expansion coil connected to the cover on its under side.

6. A cooling unit for refrigerating apparatus including a brine tank having a removable cover, a compartment within said brine tank for receiving an ice tray, and a flat spiral coil having its edges bent down and contacting with the sides of said compartment, said coil being connected to the removable cover on its under side and removable therewith.

7. A cooling unit for refrigerating apparatus including a brine tank having a removable cover, an expansion valve connected to the removable cover on its under side and means for providing an external adjustment for the expansion valve including an adjusting portion adjacent the front wall of the brine tank and a cap member projecting through the front wall of the brine tank and threaded into the adjusting portion of the expansion valve.

8. A cooling unit for refrigerating apparatus including a brine tank having a removable cover, a compartment within said brine tank for receiving an ice tray, and an expansion coil extending over the top of the compartment and having its edges bent down and contacting with the sides of said compartment, said expansion coil being connected to the removable cover on its under side and removable therewith.

9. A cooling unit for refrigerating apparatus including a brine tank having a removable wall portion, an expansion valve and an expansion coil mounted on the inner side of said wall portion and removable therewith, detachable means secured to said expansion valve and having a portion thereof projecting through a stationary wall of the brine tank, said detachable means providing access to the valve for adjusting the same from the exterior of said tank.

10. A cooling unit for refrigerating apparatus including a brine tank, an expansion valve and an expansion coil mounted on the inside of said brine tank, detachable means secured to said expansion valve and having a portion thereof projecting through a wall of the brine tank, said detachable means providing access to the valve for adjusting the same from the exterior of said tank.

11. A cooling unit for refrigerating apparatus including, a brine tank, an expansion valve, an expansion conduit connected to said valve, said valve and said conduit being located within said brine tank, and means permitting adjustment of the valve from the exterior of said brine tank.

DONALD H. REEVES.